(12) United States Patent
Krohn

(10) Patent No.: US 9,348,050 B2
(45) Date of Patent: May 24, 2016

(54) NEAR-SURFACE NOISE PREDICTION AND REMOVAL FOR DATA RECORDED WITH SIMULTANEOUS SEISMIC SOURCES

(71) Applicant: Christine E. Krohn, Houston, TX (US)

(72) Inventor: Christine E. Krohn, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 518 days.

(21) Appl. No.: 13/886,761

(22) Filed: May 3, 2013

(65) Prior Publication Data

US 2013/0315033 A1 Nov. 28, 2013

Related U.S. Application Data

(60) Provisional application No. 61/650,926, filed on May 23, 2012.

(51) Int. Cl.
G01V 1/36 (2006.01)

(52) U.S. Cl.
CPC .......... *G01V 1/364* (2013.01); *G01V 2210/324* (2013.01)

(58) Field of Classification Search
CPC ................. G01V 1/364; G01V 2210/264
See application file for complete search history.

(56) References Cited

U.S. PATENT DOCUMENTS

| 4,545,039 | A | * | 10/1985 | Savit | G01V 1/005 367/38 |
| 4,686,654 | A | * | 8/1987 | Savit | G01V 1/375 367/189 |
| 4,809,235 | A | * | 2/1989 | Dragoset, Jr. | G01V 1/364 367/20 |
| 4,878,206 | A | * | 10/1989 | Grosso | E21B 47/18 367/43 |
| 5,012,453 | A | * | 4/1991 | Katz | G01V 1/28 367/38 |
| 5,051,963 | A | * | 9/1991 | Linville, Jr. | G01V 1/366 367/43 |
| 5,287,328 | A | * | 2/1994 | Anderson | G01V 1/364 367/38 |
| 5,721,710 | A | | 2/1998 | Sallas et al. | |
| 6,219,621 | B1 | | 4/2001 | Hornbostel | |
| 6,381,544 | B1 | | 4/2002 | Sallas et al. | |
| 6,430,508 | B1 | * | 8/2002 | Sudhakar | G01V 1/364 702/17 |
| 6,651,007 | B2 | | 11/2003 | Ozbek | |
| 6,691,039 | B1 | | 2/2004 | Wood | |
| 6,721,662 | B2 | | 4/2004 | Wood | |

(Continued)

FOREIGN PATENT DOCUMENTS

WO WO 2010/093896 8/2010
WO WO 2010/123639 10/2010

OTHER PUBLICATIONS

Dougleris, P. et al. (2011), "Separation of blended data by iterative estimation and subtraction of interference noise," *Geophysics* 76, pp. 3514-3518.

(Continued)

*Primary Examiner* — Ari M Diacou
(74) *Attorney, Agent, or Firm* — ExxonMobil Upstream Research Company Law Dept.

(57) ABSTRACT

A seismic data processing method for predicting and removing unwanted near-surface noise, e.g. refracted waves and surface waves, from composite seismograms acquired with multiple, encoded seismic sources in which the time records from the different sources overlap or interfere. Surface-consistent properties are determined (403) for the near-surface noise and used to predict the noise waveforms (404) for the composite simultaneous-source seismograms, and the waveforms are then subtracted or adaptively subtracted (406) from the seismograms.

20 Claims, 8 Drawing Sheets

(56) References Cited

U.S. PATENT DOCUMENTS

| | | | |
|---|---|---|---|
| 6,735,528 B2 | 5/2004 | Wood et al. | |
| 6,754,590 B1 | 6/2004 | Moldoveanu | |
| 6,987,706 B2 | 1/2006 | Wood | |
| 7,050,356 B2 * | 5/2006 | Jeffryes | G01V 1/005 367/39 |
| 7,190,635 B1 * | 3/2007 | Killinger | G01S 17/023 367/128 |
| 7,260,021 B1 * | 8/2007 | Moerig | G01V 1/375 181/111 |
| 7,366,054 B1 | 4/2008 | Wood | |
| 7,376,046 B2 * | 5/2008 | Jeffryes | G01V 1/005 367/39 |
| 7,379,386 B2 | 5/2008 | Muyzert et al. | |
| 7,382,682 B2 | 6/2008 | Zerouk | |
| 7,382,684 B2 | 6/2008 | Love et al. | |
| 7,408,836 B2 | 8/2008 | Muyzert et al. | |
| 7,466,625 B2 | 12/2008 | Robertsson et al. | |
| 7,523,003 B2 | 4/2009 | Robertsson et al. | |
| 7,564,740 B2 | 7/2009 | Wood | |
| 7,584,057 B2 | 9/2009 | Ozbek et al. | |
| 7,599,251 B2 | 10/2009 | Love et al. | |
| 7,602,670 B2 * | 10/2009 | Jeffryes | G01V 1/005 367/40 |
| 7,672,194 B2 * | 3/2010 | Jeffryes | G01V 1/005 367/39 |
| 7,869,304 B2 | 1/2011 | Olson et al. | |
| 7,916,576 B2 | 3/2011 | Beasley et al. | |
| 7,948,826 B2 | 5/2011 | Wood | |
| 2004/0117122 A1 * | 6/2004 | Choo | G01V 1/28 702/14 |
| 2005/0135188 A1 | 6/2005 | Wood | |
| 2006/0261818 A1 * | 11/2006 | Zank | G01V 3/088 324/457 |
| 2007/0104028 A1 * | 5/2007 | Van Manen | G01V 1/003 367/38 |
| 2007/0165488 A1 * | 7/2007 | Wildey | G01F 1/66 367/101 |
| 2008/0015783 A1 | 1/2008 | Robertsson et al. | |
| 2008/0033655 A1 | 2/2008 | Ozbek et al. | |
| 2008/0205196 A1 | 8/2008 | Love et al. | |
| 2009/0005999 A1 | 1/2009 | Wood et al. | |
| 2010/0097888 A1 * | 4/2010 | Neelamani | G01V 1/005 367/53 |
| 2010/0299070 A1 | 11/2010 | Abma | |
| 2010/0302909 A1 * | 12/2010 | Muyzert | G01V 1/184 367/178 |
| 2011/0013482 A1 | 1/2011 | Eick et al. | |
| 2011/0069581 A1 * | 3/2011 | Krohn | G01V 1/364 367/43 |
| 2011/0085419 A1 * | 4/2011 | Ronnow | G01V 1/364 367/43 |
| 2011/0228637 A1 * | 9/2011 | Zamow | E21B 47/042 367/35 |
| 2011/0251968 A1 * | 10/2011 | Parker | G06Q 30/018 705/317 |
| 2013/0176819 A1 * | 7/2013 | Poole | G01V 1/34 367/38 |
| 2013/0242696 A1 * | 9/2013 | van Groenestijn | G01V 1/364 367/24 |

OTHER PUBLICATIONS

Rozemond, H.J. (1996), "Slip-sweep acquisition," *SEG, Expanded Abstracts* 15, pp. 64-67.

* cited by examiner

NEAR-SURFACE NOISE PREDICTION AND REMOVAL FOR DATA RECORDED WITH SIMULTANEOUS SEISMIC SOURCES

CROSS-REFERENCE TO RELATED APPLICATION

This application claims the benefit of U.S. Provisional Patent Application 61/650,926, filed May 23, 2012, entitled NEAR-SURFACE NOISE PREDICTION AND REMOVAL FOR DATA RECORDED WITH SIMULTANEOUS SEISMIC SOURCES, the entirety of which is incorporated by reference herein.

FIELD OF THE INVENTION

This disclosure relates generally to the field of geophysical prospecting and, more particularly, to seismic data processing. Specifically, this disclosure concerns a seismic data processing method for predicting and removing unwanted refracted waves and surface waves from composite seismograms acquired with multiple sources in which the time records from the different sources overlap or interfere.

BACKGROUND OF THE INVENTION

Such a seismic acquisition method is called simultaneous source or blended acquisition, and is used to acquire seismic surveys with a high trace density at lower cost. Refracted waves and surface-waves propagate along or parallel to the land surface or ocean bottom with a time delay or moveout that is directly proportional to the shot-to-receiver distance along the surface, and are highly affected by near-surface properties. Such seismic waves constitute noise because they carry little or no subsurface information. They have much higher amplitudes than waves that reflect from subsurface formations and should be removed prior to source separation and prior to reflection imaging. A method is disclosed herein for determining surface-consistent properties for the near-surface noise. These properties are used to predict the noise waveforms for the composite simultaneous-source seismograms, and the waveforms are then subtracted or adaptively subtracted from the composite seismograms.

In conventional seismic acquisition, a series of source gathers are recorded in sequence, one source at a time. The source or source array is fired or excited, and response of the receivers are recorded for the duration of the source excitation (sometimes called a sweep for vibroseis sources) plus the listening time, the time it takes for the seismic wave to reach and to reflect from the target. Recording stops, the recorded source gather data or seismogram are written to tape or disk, the sources move to the next source point, and the process is repeated. With the development of new acquisition systems, it has become possible to continuously excite sources without pause to write to tape or even to wait until all reflected energy is returned from the previous excitation. To reduce the acquisition time and thus cost, sources may be fired simultaneously or with small time shifts from the firing of other sources and a composite seismogram recorded. This is called simultaneous sourcing or blended acquisition. The main advantage of the cost reduction is the ability to record surveys with a large range of source to receiver azimuths (multi-azimuth) and improved target illumination. The compromise with such high efficiency methods is interfering noise or crosstalk, where the crosstalk noise results from multiple source excitation or their returns overlap in time. This crosstalk noise will be in the form of desired but misplaced reflected energy but also includes much larger near-surface noise in the form of surface waves and refractions. Sometimes source encoding is performed to reduce the crosstalk noise, but encoding alone is generally not sufficient to eliminate it. Such encoding may include time shifts and for vibrators, differences in phase, frequency, pseudo-random sequences, sweep rate, etc.

Separation of Simultaneous Source Data

Before conventional processing, the individual source gathers must be separated from the composite seismograms. The goal is to produce a separated gather for each source location with little or no crosstalk or interference noise from other sources excited within the same time window. Alternatively, it is possible to image or perform full waveform inversion directly from the composite records. In this case, the migration or inversion method simulates the wave-equation response for the multiple sources with the field encoding pattern, and then applies an imaging condition, but crosstalk noise is still an issue. An imaging condition is a condition applied at each point to a wavefield to extract that part of the wave that has reflected at the given point.

We will define full separation as the generation of multiple seismograms, with each seismogram corresponding to each single individual source location as if the source was excited by itself. In other words the seismic energy from each source in the composite record is moved to the appropriate seismogram and eliminated from other records. Good separation in one step is only possible if the problem or inversion is well-posed, and there are as many input records as output records. In the HFVS method, as described first by Sallas, et al. (see, for example, U.S. Pat. No. 5,721,710), a number of phase-encoded sweeps are recorded for a group of sources, with the number of sweeps equal to or greater than the number of sources. The vibrator signatures (or sweep functions) are then inverted to create a linear separation filter that when applied to the data optimally separates the data generating as many output records as there were sources. Because the number of input records is greater than the number of output records, the sweep inversion is well-posed and can be computed directly from the sweep reference functions. The presence of noise in the composite records does not strongly affect the quality of separation. But the requirement for multiple sweeps requires more time to acquire the data and limits efficiency of acquisition.

For maximum efficiency and minimal cost, it is desirable to use only one shot or sweep per source location. In this case, multiple shot records must be produced from a single composite record. As described by Neelamani, et al. (U.S. Patent Application Publication No. 2010/0097888) this is an ill-posed problem; the number of inputs is less than the number of outputs. The simplest method to generate multiple source gathers is a simple decode and extraction process, sometimes called pseudo-separation or pseudo-deblending. This process replicates the data and parses it to generate the respective source records, one at a time. Each extracted record contains the extracted source record plus all of the interference noise from other shots. Decoding may involve simply shifting the data by the corresponding start time for the respective source and extracting the time window corresponding to the excitation plus listening time. In the case of vibroseis, it may also involve correlating or deconvolving with a corresponding sweep. In this latter case, some cross-correlation noise remains; it is not possible to implement perfectly orthogonal encoding function or sweep, especially considering nonlinear vibrator mechanisms that generate harmonics. A good example of extracted or pseudo-separated seismograms is illustrated by H. Rozemund ("Slip sweep acquisition," *SEG, Expanded Abstracts* 15, 64-67 (1996)).

The pseudo-separated seismograms with inference noise may be filtered in some domain to partially mitigate the interference noise. Even without filtering, the imaging or migration process maybe sufficient for simple structural objectives, but if amplitudes are to be used for stratigraphy or for reservoir property estimation, signal-to-noise enhancement or filtering is needed. Filters only remove the crosstalk noise on each seismogram and do not move misplaced energy to the appropriate seismogram or optimize the separation. The most common filtering method is to sort the data to the common receiver domain or other non-shot domain. In the receiver domain, the interference noise appears random and a coherency filter, such as fk-filter, radon filter, median filter, etc., may be used to remove the incoherent noise and keep the more coherent signal. A problem with these filtering methods is that signal is easily damaged and removed with the noise, especially if the noise is large and requires aggressive filtering. In addition, the use of multi-channel filters requires that the survey be recorded with dense sampling in all directions without aliasing.

An improved method involves an initial extraction or pseudo-separation followed by an interactive inversion method as described by Neelamani, et al. (U.S. Patent Application Publication No. 2010/0097888). Because the problem is ill-posed, some additional information is needed, such as an estimate of the source signature and expectations for separation seismograms, such as dips, decreasing amplitudes, coherency, etc. In this method, with each iteration, more of the misplaced seismic energy, i.e. the interference noise, is increasingly moved to the proper record and the separation is improved. A version of the method is described by Dougleris, et al., "Separation of blended data by Iterative estimation and subtraction of blending interference noise," *Geophysics* 76, Q9-Q17 (2011)). Note that in this paper, the maximum signal-to-noise enhancement is about 18 dB and the data involve interference only in the form of misplaced reflected signal and no near-surface noise. All high amplitude ground-roll and first arrival events were first removed before summing the gathers to simulate simultaneous source acquisition for this research test. Subsequent patents on use of sparse-type inversion methods for separation include Abma (US Patent Application Publication No. 2010/0299070) and Moore et al. (PCT International Patent Application Publications WO 2010/093896 and WO 2010/123639).

Near-Surface Noise

Large and variable surface-wave noise is a problem for traditional sequential acquisition methods; it is an even bigger problem for simultaneous source acquisition, regardless of whether or not the composite records are imaged directly or are first separated into source gathers. Most separation methods, particularly those that involve multi-channel filters, are compromised if the data contain large interference noise. Much more energy from a seismic source goes into refractions and surface-waves, which travel parallel to the surface of the earth, than travel vertically through the earth, reflect, and return to the surface. Furthermore because of 3D spherical divergence, reflected amplitudes decrease rapidly, varying inversely with the two-way travelpath distance to the reflectors and back to the surface. Because refractions and surface-waves are confined to the surface, their amplitude decreases by a factor proposal to the square root of distance—a much smaller decrease. Such unwanted noise in the form of surface waves may be 40-60 dB larger than the desired reflections and be a problem for iterative ill-posed separation methods. For example, in Mandad's method, a coherency filter is applied and then amplitude thresholding is used to keep the strongest amplitudes during each iteration; this method will keep the strong unwanted ground roll and eliminate the weaker desired reflections. He found only 18 dB of separation for an example without any surface waves.

A patent to Olson, et al. (U.S. Pat. No. 7,869,304) removes noise on the receiver data before applying the HFVS-type separation filter derived by inverting the sweep matrix. The filters include single or 2D multi-channel filters, such as wavelet transform filter, F-X filter, F-K filter, or median despike filter. If the choice is made of a linear noise filter, such as F-K or FX or wavelet transform, then it can applied before or after the linear separation filters under the cumulative property of multiplication; the output is the same. This method does not address the problem of noise for separating high-efficiency and multi-azimuth vibroseis data in which there are fewer sweeps than sources and in which the sweep matrix cannot be inverted. Furthermore, it does not address the 3D multi-azimuth problem discussed below.

Multi-trace filters are often used for surface-wave mitigation. These methods exploit velocity differences; surface waves are typically much slower in velocity than reflections. Velocity filtering methods include FK filtering, radon filters, adaptive filtering, or beam forming (see, for example, U.S. Pat. No. 6,651,007 to Ozbek). A problem with such methods is that they require a sufficiently short distance between each of the receivers so that the recorded ground roll is not aliased, i.e. so that the surface wave is adequately sampled. If the distance is too large, then ground-roll velocity is ambiguous and it has similar apparent velocity to reflections. Another problem with multi-channel filters is that the character of the near-surface noises changes rapidly as a function of location because it is heavily influenced by highly variable near surface properties. Ozbek teaches an adaptive filter method to compensate for these changes. The adaptive method cannot simultaneously adapt to contributions from different sources from different distances and azimuths recorded by the same receiver.

FIGS. 1-3 illustrate the problem of using multi-trace filtering for 3-D data that is recorded by simultaneous sources according to the prior art. We start from conventional data and simulate the case in which the data were generated by simultaneous sourcing by summing records in the computer instead in the field. FIG. 1 shows a map of a standard 3-D orthogonal acquisition geometry with the receivers represented by "x" and the sources represented by "o". We start with one receiver line 101 and plot the conventional records generated by sources at locations 102-104 in FIGS. 2A-2C. The gathers in FIGS. 2A and 2B were shifted by 0.5 and 0.8 s, respectively, and then three source gathers were then summed to simulate the composite record FIG. 2D, as if the sources 102-104 were excited simultaneously with the small time shifts. An F-K spectra (FIG. 3A) computed from the conventional gather (FIG. 2A) recorded with the single source 102 located on line 101 shows low-velocity surface waves 201 and 301, aliased surface waves 302, and reflections 303. An FK-fan filter could be constructed to remove most of the surface-wave energy outside of the dashed lines 304 as is done for this example of conventional data acquisition. In comparison, we show an F-K plot of the composite simultaneous-source gather (FIG. 2D) in FIG. 3B. Substantial surface wave energy 305 occurs inside the dashed lines 304, and could not be removed without damaging reflections. Because sources 103 and 104 are offline from receiver line 101, part of the surface wave appears flat as shown in 202 and has low wavenumbers. With 3D multi-azimuth simultaneous-source acquisition, it is not possible to construct a narrow-azimuth line of data that goes through all simultaneous source locations, for example the sources 102-104. Thus, some of the energy will be traveling perpendicular to the receiver line with little apparent velocity discrimination compared with reflected energy.

Accordingly there is a need to remove near-surface noise in the form of refractions and surface waves traveling along the surface of the earth or ocean bottom directly from composite records obtained with simultaneous sourcing acquisition and without relying on multi-channel filters. The signal-enhanced seismograms can then be separated into individual source records or imaged directly.

SUMMARY OF THE INVENTION

In one embodiment, the invention is a method for predicting and removing near-surface noise from seismic data acquired using a plurality of encoded sources operating simultaneously so as to produce time-overlapping records at each of a plurality of seismic receivers, comprising: (a) using locations of the sources and their respective encoding information to characterize near-surface properties affecting propagation of seismic energy along the surface from each source to each receiver; (b) using a computer to predict time-overlapping noise recorded by a selected receiver; and (c) subtracting or adaptively subtracting the predicted noise from the seismic data measured by the selected receiver to yield data with reduced near-surface noise.

Typically, the method is repeated for each receiver location used in the survey.

BRIEF DESCRIPTION OF THE DRAWINGS

The present invention will be better understood by referring to the following detailed description and the attached drawings in which:

FIG. 2D is a composite seismogram created by summing FIGS. 2A-2C to simulate simultaneous source acquisition with small time shifts between source excited at 102, 103 and 104;

FIG. 7A is the composite seismogram of FIG. 2D, FIG. 7B shows the surface waves predicted using FIG. 6 and other properties, and FIG. 7C is the seismogram with surface waves removed by subtracting 7B from 7A.

Due to patent law restrictions on the use of color, FIG. 6 is a black-and-white reproduction of a colored data display.

The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present inventive method determines surface-consistent properties for the near-surface noise and uses them to predict the noise waveforms for the composite simultaneous-source seismograms, and the waveforms are then subtracted or adaptively subtracted from the seismograms.

Figure 1:
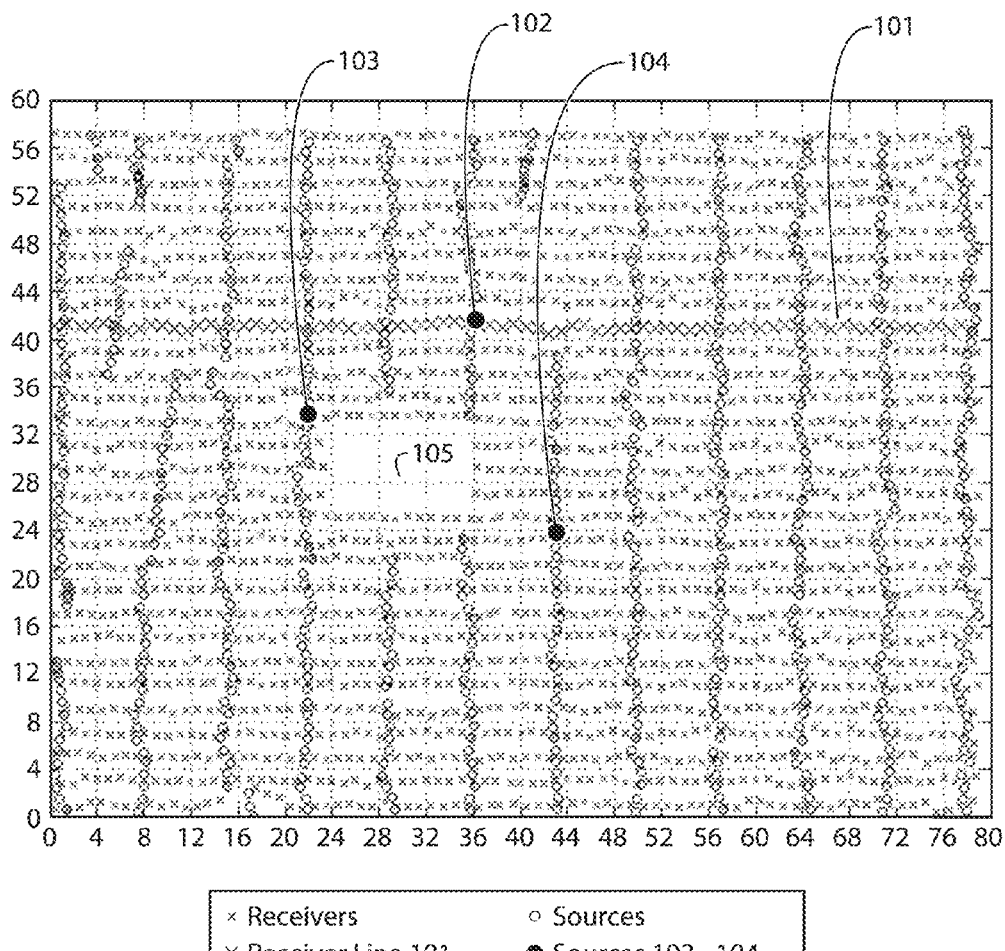
FIG. 1 is a map of sources and receiver locations for part of a 3D survey.
Figures 2A, 2B, 2C, 2D:
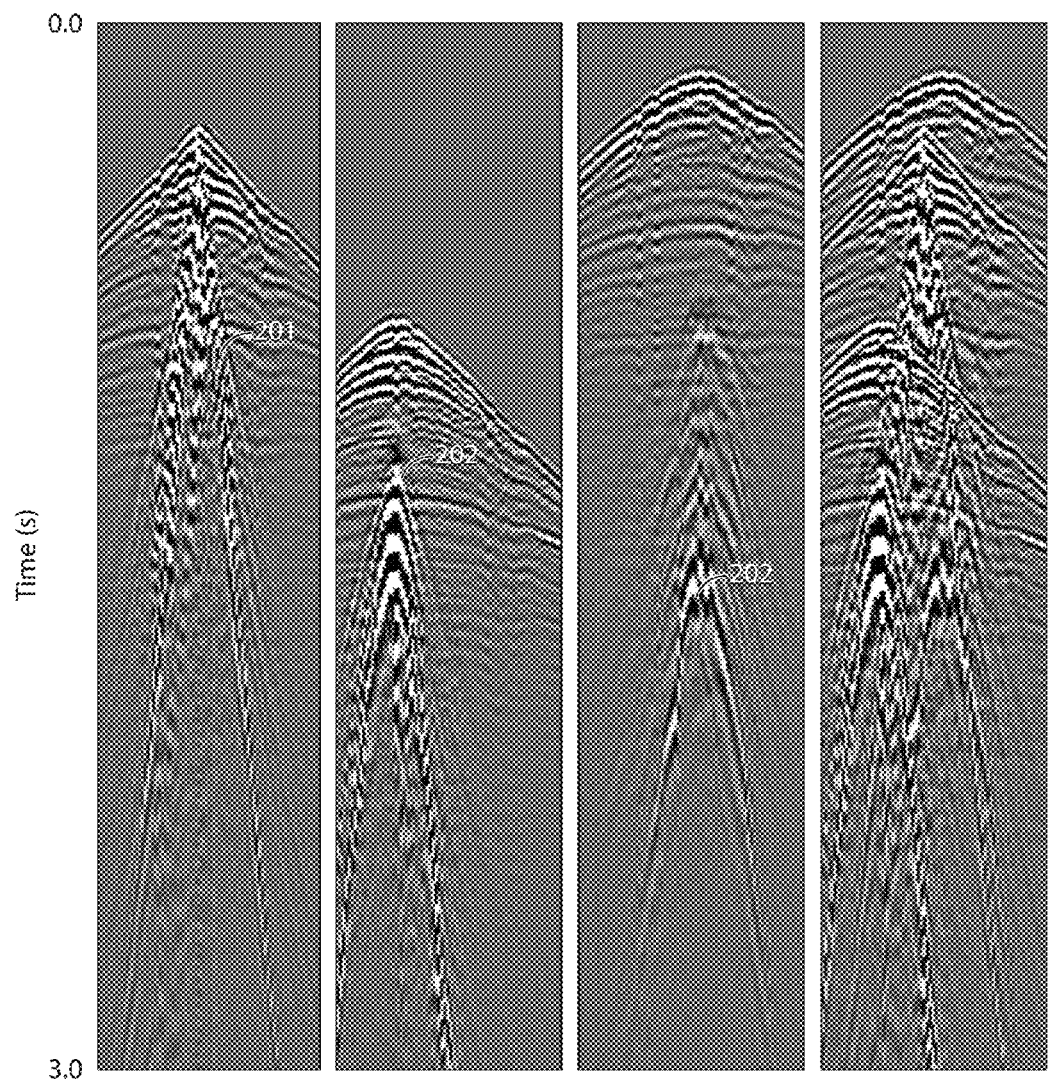
FIGS. 2A-2D are sample source gathers recorded by receiver line 101 in FIG. 1, with FIGS. 2A-2C corresponding to sources at 102, 103 and 104; these gathers are shifted by 0.5, 0.8, and 0 s, respectively.
Figures 3A, 3B:
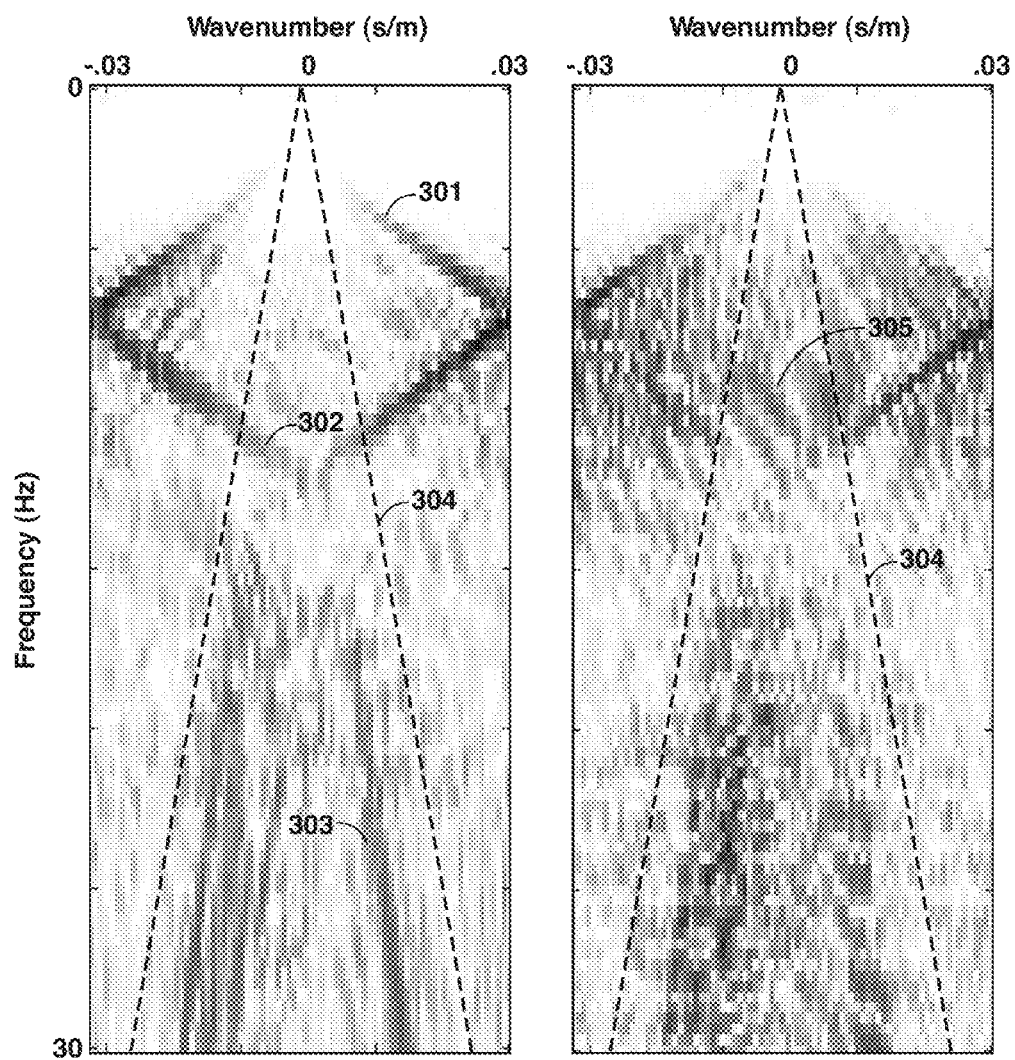
FIGS. 3A-3B show results of an FK transform which could be used to filter surface waves according to the prior art; an FK-spectrum (FIG. 3A) is shown for the conventional single-source record of FIG. 2A and an FK-spectrum (FIG. 3B) is shown for the composite simultaneous-source seismogram of FIG. 2D.
Figure 4:
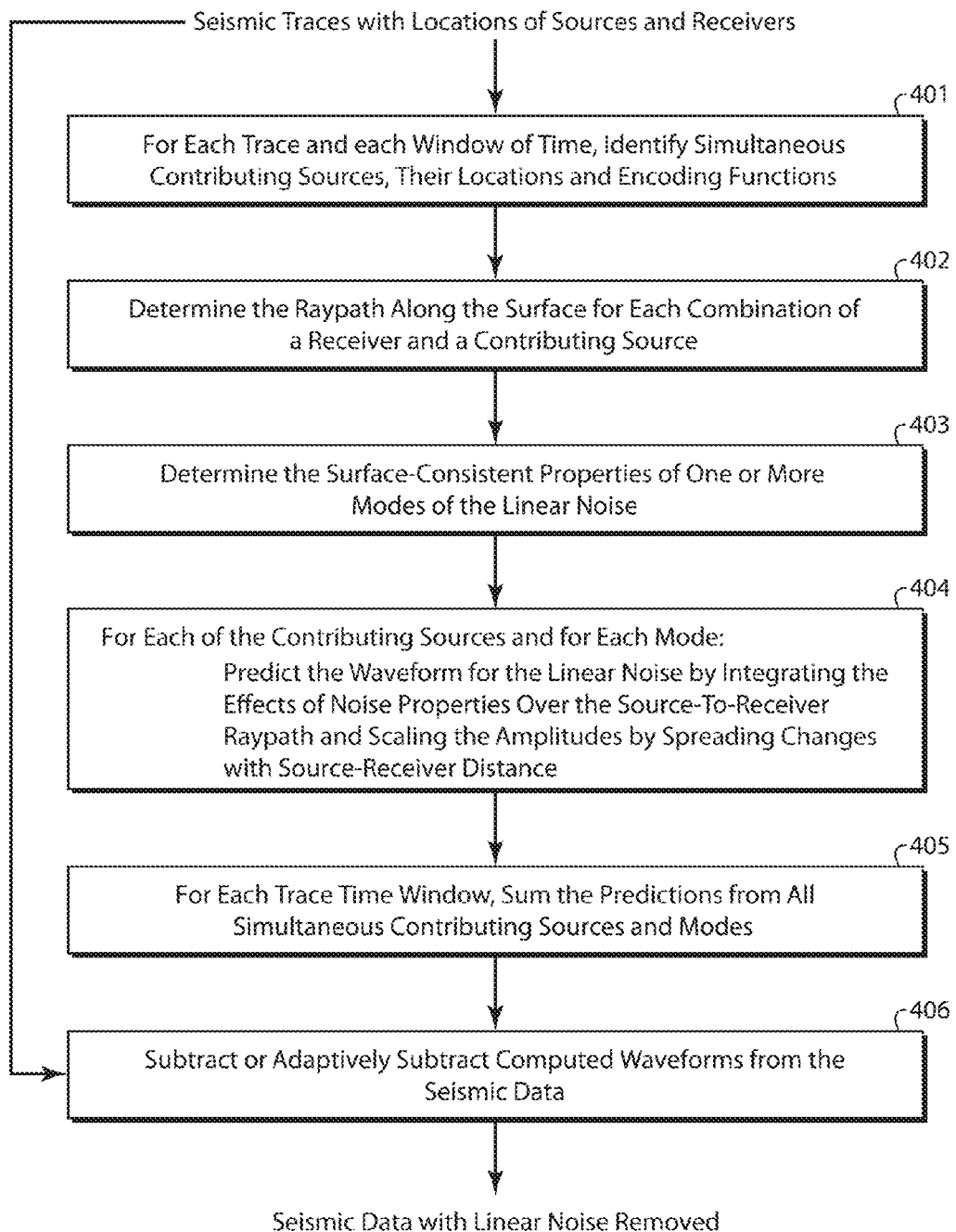
FIG. 4 is a flow diagram showing basic steps in one embodiment of the present inventive method for removing near-surface noise.
Figure 5:
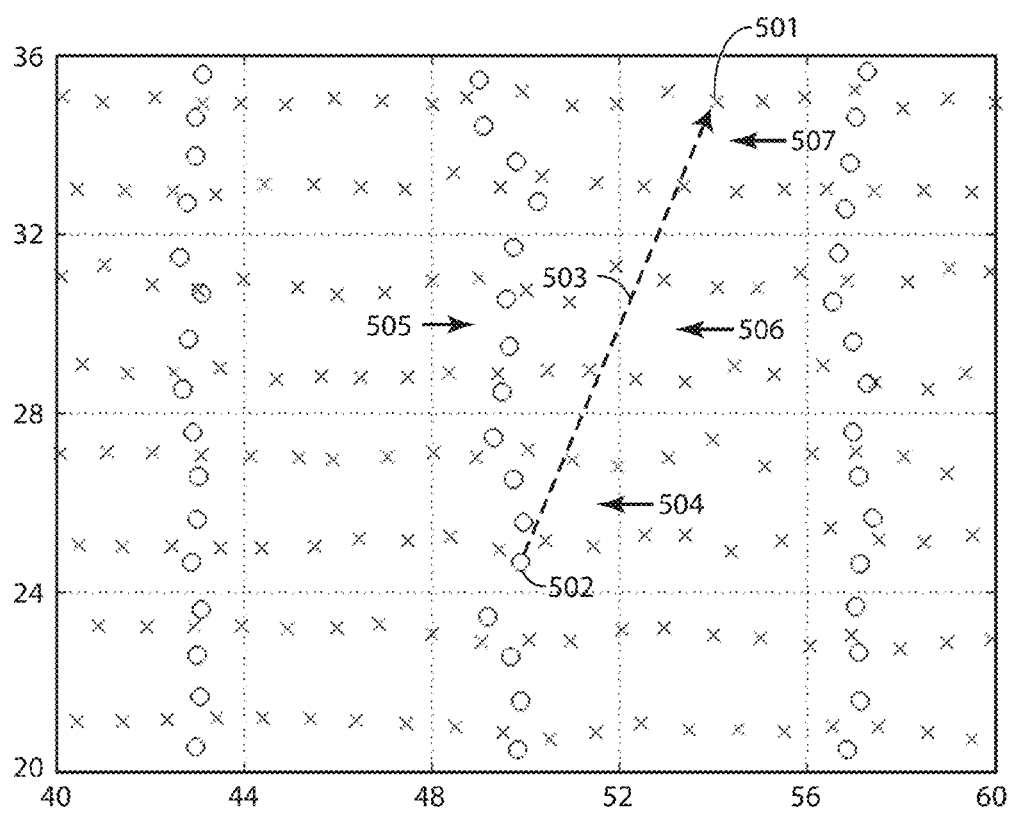
FIG. 5 shows a zoomed (exploded) section of FIG. 1 showing source and receiver locations of a portion of the 3D survey.
Figure 6:
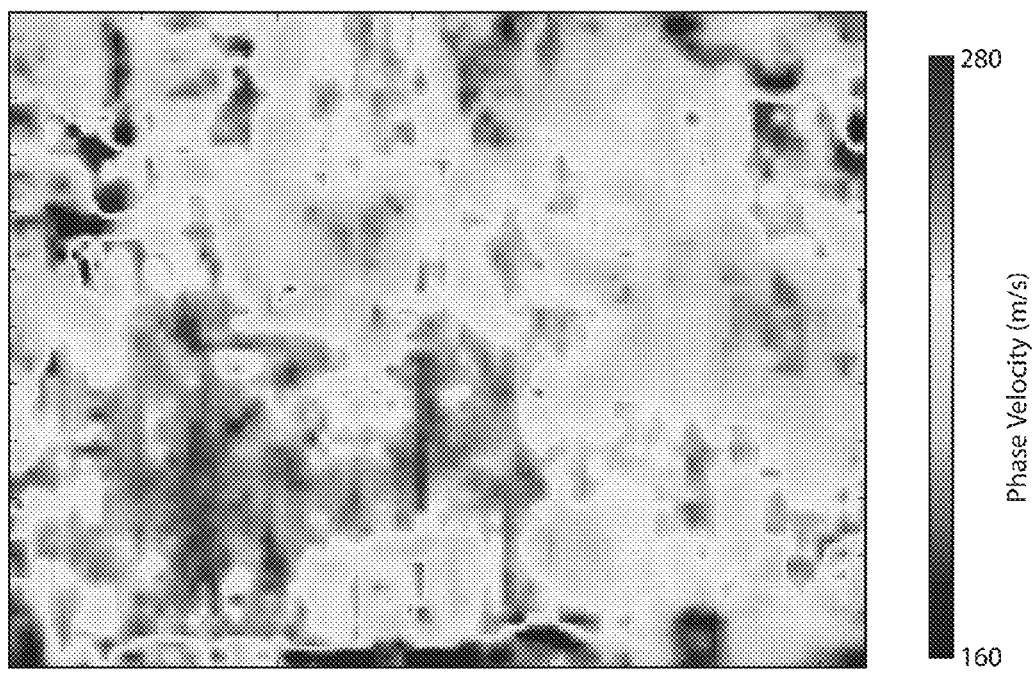
FIG. 6 shows variable velocities for 7-Hz surface waves as a function of location on the map shown in FIG. 1.

To begin, seismic traces may be optionally divided into smaller time windows for analysis. Referring to the flowchart of FIG. 4, in step 401, for each time window, contributing and interfering sources are identified. These are sources that, based on their firing time relative to the time window for the trace window and their distance to the receiver and estimated moveout velocity of the near-surface noise, could have contaminated the trace window with the near-surface noise. If no sources are found, the trace window is discarded. The time and decoding function for each source relative to the window start time is saved. Then in step 402, the raypath along the surface of the earth between each source and each receiver is estimated. For example in FIG. 5, which is an enlargement of part of the acquisition geometry shown in FIG. 1, a straight-line raypath 503 is drawn between source 502 and receiver 501. If velocities are known, a raypath can be computed by ray-tracing between sources and receivers using Snell's Law. In FIGS. 1 and 5, the numbers on the axes are based on a processing grid with inline (horizontal axis) and crossline (vertical axis) position numbers.

In step 403, the properties of one or more modes of waves that travel along the source-to-receiver raypaths are determined as a function of the spatial location on the surface of the earth. This may involve designating surface regions, call bins or cells, indicated as 105 in FIG. 1 or 506 in FIG. 5. These regions may be uniform or non-uniform and they may have variable sizes. Alternatively, a mathematical relation can be determined for the properties expressed as a function of the map coordinates. Propagation properties, i.e. velocity and attenuation, may be determined by velocity analysis, f-k analysis, by beam forming a small array of receivers as in Lee and Ross (WO 2009/120402) or by the waveform tomography method described below. In addition, properties corresponding to the source and receiver locations, i.e. the source or receiver coupling of the energy for the specific near-surface mode, may also be determined.

In step 404, the final set of surface-consistent parameters and the respective contributing sources and their times and encoding functions are used to predict the composite waveforms for the near-surface noise. In this step, the full trace, not just the windowed trace, can be used if desired. Also data traces that were not used in step 403 can be predicted. Waveforms are predicted by integrating the effects of the noise properties over the source-to-m receiver raypath from the source to the receiver, and then scaling the amplitudes by the expected amplitude decrease with distance. The raypath distance for each contributing source to the receiver is different and they pass over different portions of the surface with different properties. Waveforms are delayed and attenuated along the raypath because of the velocity and attenuation properties of the near surface materials. In addition, waves that are confined to the surface have amplitudes proportional to the inverse square root of the distance traveled because of cylindrical spreading. It is desirable that the predicted waveforms match the actual waveforms as close as possible in order to avoid use of a heavy match filter in step 405, which might harm signal. Because the interfering sources have different raypath distances for the interfering near-surface waves, adjusting for both amplitude and phase effects can be important.

Figures 7A, 7B, 7C:
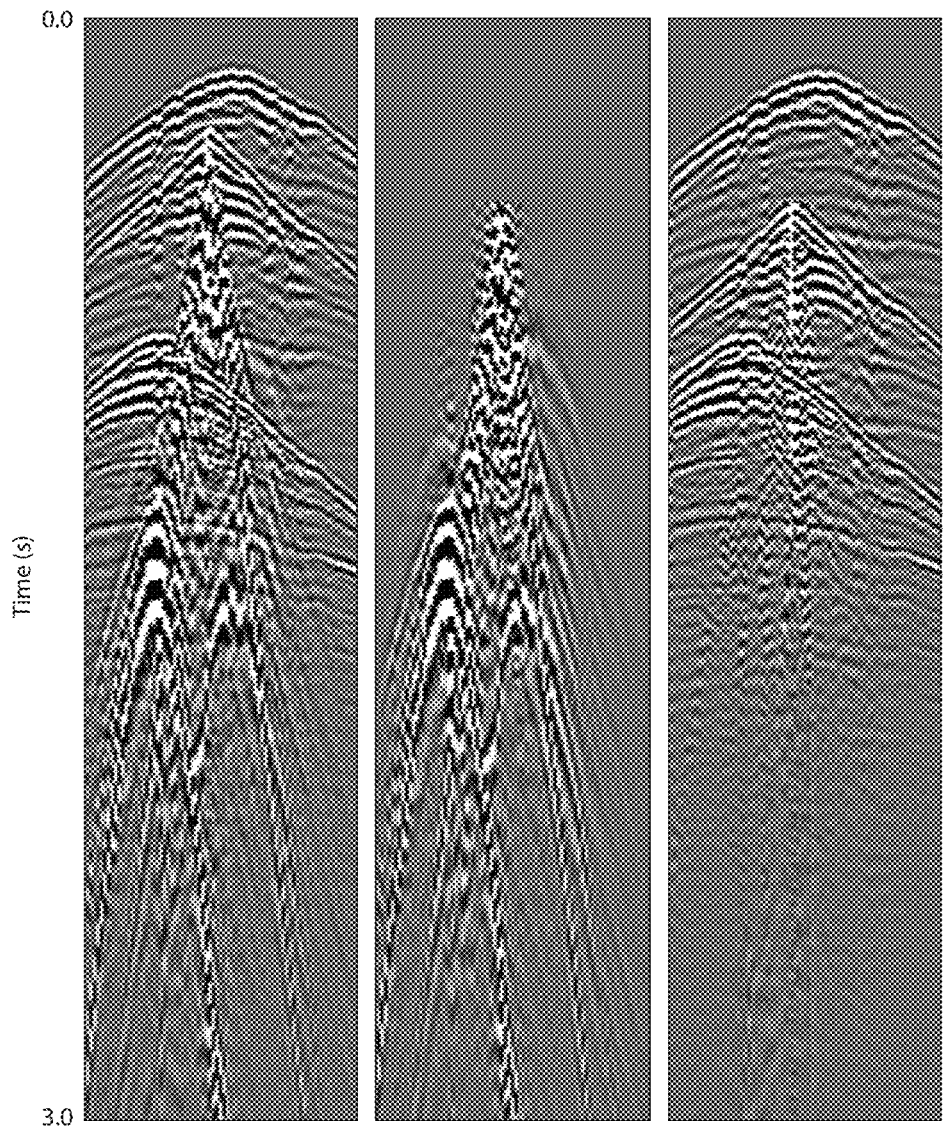
FIGS. 7A-7C show example results of applying the present inventive method, where

In step 405, the waveforms from the contributing sources are summed so that they interfere and form a composite record. An example is shown in FIGS. 7A-7C. FIG. 7B represents the predicted waveforms for three surface-wave modes from interfering sources 102-104. In step 406, the predicted near-surface noise is subtracted or adaptively subtracted from the seismic data. For example, FIG. 7B is subtracted from the raw data FIG. 7A to remove the interfering surface wave noise, as shown in FIG. 7C. Adaptive subtraction may include computing a match filter for each mode and applying the filter before subtraction.

With the near-surface noise removed, the reflected signal is enhanced. The data can now be used in its composite form for simultaneous source imaging or FWI inversion. Alternatively, a separation process could be performed to separate the composite records into individual source gathers for conventional processing and imaging.

Next, some steps of the inventive method are explained for certain embodiments of the invention in more detail.

Surface-Consistent Parameters and Model Expression for Steps 403 and 404

This section is a discussion of a preferred set of surface-consistent parameters for the prediction of waveforms for the near-surface modes as used in steps 403 and 404. We will consider multiple modes of propagation in the form of near-surface noise. Surface waves are known to propagate as a fundamental pseudo-Rayleigh waves and additional higher order modes. These are dispersive; i.e., their velocity changes with frequency. We will also consider other near-surface noise, in particular, refractions, and guided waves as additional modes. Some of these, such as refractions and some guided waves are not dispersive and their velocity is independent of frequency. All of these travel along or parallel to the surface of the earth, and their moveout is directly proportional to the distance traveled.

Starting with a single mode of wave propagation, the simplest mathematical model to describe the waveform assumes plane wave propagation in a straight line from the source at 502 to the receiver at 501 and through the surface bins, 504-507 along the raypath 503. In the frequency domain, the modeled data trace $t_{w,k}(f)$ for a time window w and receiver number k and multiple simultaneous sources u=1 to N(w) can be written as follows:

$$t_{w,k}(f) = r_k(f) \sum_{u=1}^{N(w)} \left( \sum_{j=j(l)}^{j=j(k)} d_j \right)^{-1/2} c_{w,u}(f) s_{l(w,u)}(f) e^{-i2\pi f \sum_{j=j(l)}^{j=j(k)} p_j(f) d_j} \quad (1)$$

In expression 1, all variables, t(f), r(f), c(f), s(f), and p(f) are complex and can be functions of frequency. The trace window w includes a number N(w) of contributing simultaneous source stations as identified in step 401, with each active source in that window of time identified by the index u=1 to N(w). The waveform contributions from each of these sources are summed. The surface-consistent parameters in Eq. 1 that will be determined by model optimization in the step 403 include parameters $r_k$ related to receiver station k, $s_l$ related to source station l, and $p_j$ related to propagation across each bin j along the raypath from source to receiver. The waveform for each active source u includes the following effects:

$r_k(f)$: Receiver coupling term for receiver number k, where k is a unique index number for every receiver location or station in the survey. The receiver coupling parameter is complex and includes both amplitude and phase effects associated with receiver station k. The term is optional; one can assume it is 1.0, i.e. no variation in receiving effects. We choose to make this term mode independent for purposes of this current example embodiment of the invention. For multicomponent receivers, we would have one set of $r_v$ parameters for the vertical components and another set corresponding to horizontal components $r_h$.

$$\left( \sum_{j=j(l)}^{j=j(k)} d_j \right)^{-1/2} :$$

Amplitude decrease related cylindrical spreading (see step 404), which is proportional to the inverse square root of the total source-to-receiver distance. This can be computed as the sum of the individual distances across each bin summed over all bins from the bin at source l, j(l), to the bin at receiver k, j(k). Note this expression is known. See step 404.

$c_{w,u}(f)$: Source encoding term for window w and contributing source index u. If the encoding is done by each source u having a different start time or jitter $t_u$ relative to the start of the window, then $c_{w,u}(f)=e^{-i2\pi f t_u}$. Note this expression is known.

$s_{l(w,u)}(f)$: Source coupling term for source station l, where l is a unique index number for every source location or station in the survey. The particular source activated in window w for its source index u is l(w,u). The source coupling is complex and includes both amplitude and phase effects associated with station l. A different source coupling parameter would be determined for each mode of propagation and for each component of motion. This is a significant parameter; each mode of propagation has a different function for relating the coupling energy from the source into that mode of propagation.

$$e^{-i2\pi f \sum_{j=j(l)}^{j=j(k)} p_j(f) d_j} :$$

Plane wave propagation across the raypath from each source to the receiver. The complex slowness in each bin $p_j(f)$ is multiplied by the corresponding travelpath distance $d_j$ for that bin, which is known. The product is summed for each bin from the bin at source l, j(l), to the bin at receiver k, j(k). The complex slowness includes a real part equal to the inverse of velocity v(f), and imaginary part equal to attenuation and inverse of the attenuation quality factor Q(f), both of which are considered frequency dependent for dispersive waves. The complex slowness differs for each mode of propagation, but it is independent of components of motion, i.e. horizontal or vertical components. The complex slowness can be derived from velocity v, and Q as:

$$p_j(f) = \frac{1}{v_j(f)} - i\frac{1}{2v_j(f)Q_j(f)} \quad (2)$$

When there is more than one mode, the contributions from each mode interfere with each other generating more complex waveforms. In the frequency domain, we sum over a small number of M modes where now the source parameters s and propagation parameters p are different for each mode from mode m=1 to M. Equation 1 for multiple modes becomes:

$$t_{w,k}(f) = \quad (3)$$
$$r_k(f) \sum_{u=1}^{N(w)} \left( \sum_{j=j(l)}^{j=j(k)} d_j \right)^{-1/2} c_{w,u}(f) \sum_{m=1}^{M} S_{m,l(w,u)}(f) e^{-i2\pi f \sum_{j=j(l)}^{j=j(k)} p_j(f) d_j}$$

Given the surface-consistent properties for sources, receivers, and complex slowness, then Equation 1 or 3 can be used to predict the waveforms of the near-surface noise (step 404) as in computing a forward model. Given the data, then Equation 3 can be inverted to find the parameters that best fit the data for step 403.

Waveform Tomography (step 403)

Figure 8:
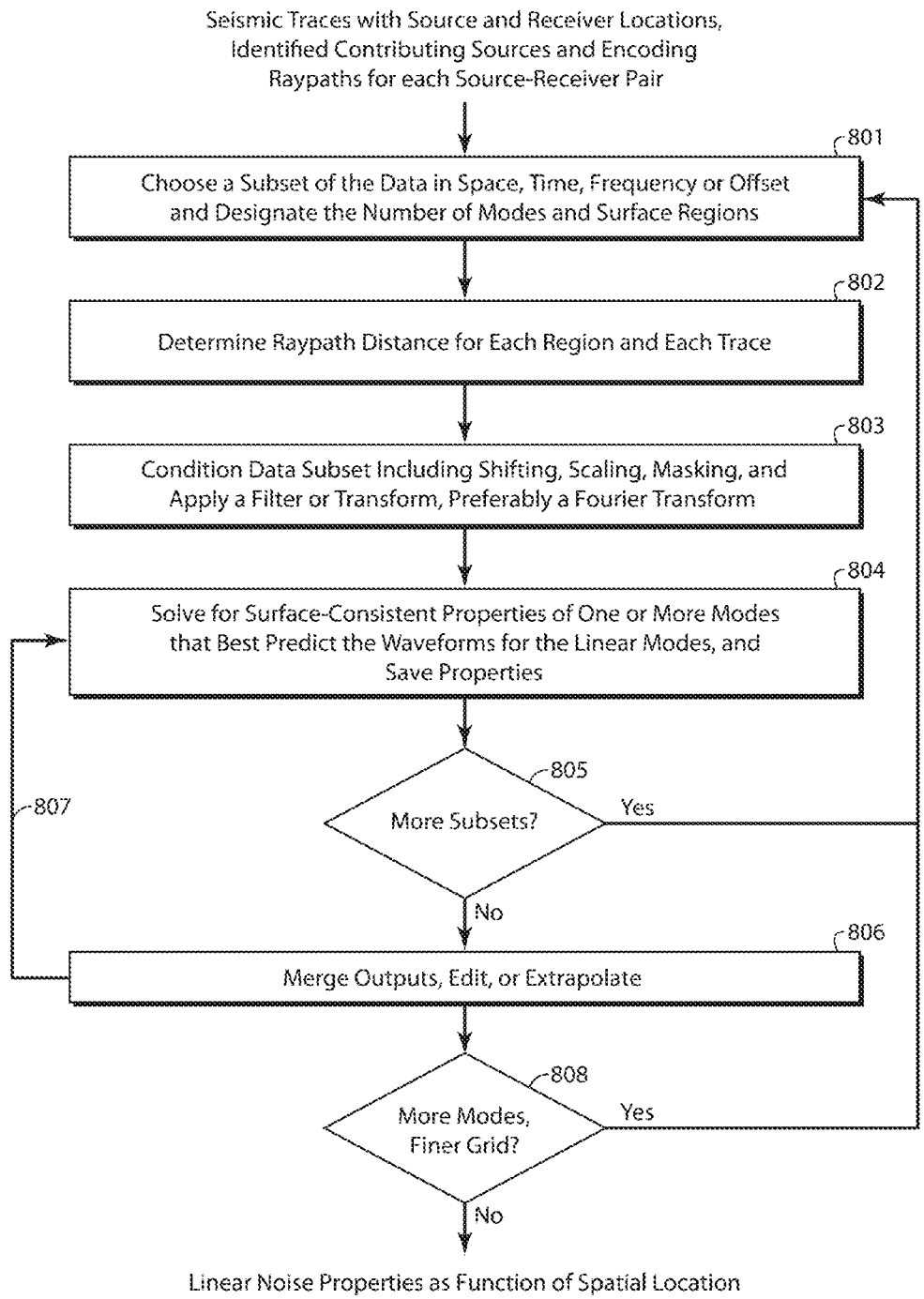
FIG. 8 is a flow diagram showing basic steps in performing step 403 of FIG. 4 in one embodiment of the present inventive method.

A preferred embodiment for performing step 403 is now described in which waveform tomography is used to determine near-surface properties for simultaneous source data. Steps are shown in FIG. 8.

In step 801, a subset of the data and parameter space is selected. This subset may include different time and frequency windows, different offset ranges, or different regions of the survey. We have found it helpful to reduce the size of the problem for early iterations for 3D data by starting with smaller geographical areas and large bins, and then later inverting the full area for a smaller range of frequencies to ensure the solution is well coupled. Because the inversion is much faster if we are solving for fewer unknowns, it makes sense to start small and increase the size when we are closer to the solution. Also this makes the problem more suitable for parallelization. In other words, steps 801 to 805 for different subsets of the data could be assigned to different parallel processors and the results merged in step 806. If the initial guess is too far from the actual solution, too much of the data does not match the model and it appears as noise. The misfit does not decrease, and no solution is found. Dividing up the problem into smaller chunks avoids this problem. Alternatively, a coarse grid can be used initially followed by subsequent inversions with smaller grids.

In step 802, the survey area is divided into bins or regions as shown by the square bins 105, and the raypath distance for each trace across each bin is computed. For example, in FIG. 5, a distance is computed along the source-receiver raypath 503 across each of the bins 504, 505, 506 and 507.

In step 803, the data are conditioned. This may include shifting and scaling the trace window, masking part of the data, and applying a filter or linear transform, which is preferably a Fourier transform but may be a FK transform, wavelet transform, curvelet transform, radon transform, cross correlation, or another filter.

In step 804, model optimization is used to solve simultaneously for surface-consistent properties of one or more modes of linear noise that best predict the composite data records. The prediction includes the time and encoding functions for each contributing source. Preferably the model optimization algorithm includes regularization, constraints, and bounds, and it may involve using prior information or results computed previously to construct an initial model as indicated by 807. Note that with this method, the individual trace windows can be in any order, there is no need for a source gather or "pseudo-separated" source gather. The full data redundancy of data traces, which have different raypaths, different source-receiver distances and different azimuths, is used to decompose overall changes in the linear noise waveforms into the individual surface-consistent components. Given the conditioned data traces, associated receiver and source indexes, and propagation paths, we can solve for the model parameters using Equation 1 or 3. The solution is highly over-determined and sparse. The slowness within each bin is determined only by the traces that cross that bin, and their contribution is weighted by the travel distance. The source coupling for a source at a given location is determined only by data recorded with that source active. The number of parameters per frequency and each mode is a sum of the number of sources, plus the number of receivers, plus the number of bins, but the number of traces or trace windows is larger. Thus the inversion is nonlinear but well posed.

The tomographic inversion is improved by incorporating regularization, constraints and bounds. We formulate the problem as a regularized inverse problem by minimizing a generalized L2-model norm subject to fitting the objective function given by $$= \|W_t(t_{obs} - t_m(m))\|^2 + \quad (4)$$
$$\beta\left(\alpha_f \left\|\frac{d}{df}(m(x,y,f) - m_o)\right\| + \alpha_x \left\|\frac{d}{dx}(m(x,y,f) - m_o)\right\| + \alpha_y \left\|\frac{d}{dy}(m(x,y,f) - m_o)\right\|\right) + \lambda\varphi(m_{min}, m_{max}),$$

where $W_t$ is a data weighting matrix;

$t_{obs}$ are the observed data;

$t_m(m)$ is the model (Eq. 1 or 3) predicted data as a function of the model parameters m, which include receiver, source and slowness parameters;

β is the regularization parameter—this parameter ensures that the method does not fit extraneous events or reflections;

$\alpha_f$, $\alpha_x$, $\alpha_y$ are weights for constraints in smoothness in frequency f and in spatial dimensions x and y;

λ is the barrier parameter; and

φ a function of the minimum and maximum bounds for model parameters m.

The additional terms in the objective function beyond the data misfit work together to insure that the fit is to the near-surface noise and not to other events such as reflections and environmental noise. The regularization parameter is the most important. Large values give more weight to fitting the model, while small values give more weight to the data. We may iterate over the regularization parameter, starting at a high value and dropping it by a factor of 5 to 10, but stopping once the misfit stops decreasing. With the sum of a number of sources and number of modes, the problem becomes nonlinear. We can solve it with a nonlinear interior point method as outlined in Table 1.

TABLE 1

Model Optimization Algorithm

1. Start with initial model parameters $m_0$
2. Loop over Regularization Parameter $\beta$
3. Loop over Barrier Parameter $\lambda$
   a. Form the linearized system of equation
   b. Solve using Conjugate Gradient with Least Squares
4. Loop over Line Search Parameter $\xi$
   a. check objective function decrease
   b. If not reduce the line search parameter
   c. Update the model
5. Close Loop over Line Search Parameter
   a. Check convergence
   b. Reduce barrier parameter
6. Close Loop over Barrier Parameter
   a. Reduce the regularization using a cooling schedule
7. Close Loop over Regularization Step 805 represents a decision to repeat or loop steps 801-805 for different subsets of the data. The output of different iterations is merged and edited in step 806 and it can be used for the initial model for subsequent iterations of step 804. Preferably, the process 801-807 starts with small subsets, large bins, and fewer modes and as the solution becomes closer, larger subsets, smaller bins, and all the modes are used.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for predicting and removing near-surface noise from seismic data, comprising:
   acquiring the seismic data by exciting a plurality of encoded sources operating simultaneously so as to produce time-overlapping records that are recorded at a plurality of seismic receivers;
   using locations of the sources and their respective encoding information to characterize near-surface properties affecting propagation of seismic energy along the surface from each source to each receiver;
   using a computer to predict time-overlapping noise recorded by a selected receiver; and
   subtracting or adaptively subtracting, with a computer, the predicted noise from the seismic data measured by the selected receiver to yield data with reduced near-surface noise,
   wherein the characterizing of near-surface properties comprises using waveform tomography using an iterative model optimization method.

2. The method of claim 1, further comprising repeating the method for at least one additional selected receiver.

3. The method of claim 1, wherein the source encoding information comprises at least one of a group consisting of time shifts, phase shifts, different sweep rates, and other encoding functions.

4. The method of claim 1, wherein the sources are seismic vibrators.

5. The method of claim 1, wherein at least two different modes of near-surface noise are characterized, modeled, and subtracted.

6. The method of claim 5, wherein the at least two different modes comprise at least two of a group consisting of surface waves, refracted waves, and guided waves.

7. The method of claim 1, wherein the characterizing near-surface properties and the predicting of the time-overlapping noise comprise:
   for each seismic data trace in the seismic data and a selected time window, identifying simultaneous contributing sources, their locations, and their encoding functions;
   determining raypaths along the surface connecting each receiver to each contributing source;
   determining the surface-consistent properties of one or more of modes of propagation of seismic energy along the raypaths; and
   for each of the contributing sources and for each mode, predicting a waveform for the near-surface noise by integrating effects of the surface-consistent properties over a raypath connecting the contributing source to the selected receiver and down-scaling seismic amplitudes to account for wave-spreading changes as distance from the source increases.

8. The method of claim 7, wherein the determining of the surface-consistent properties comprises using an iterative optimization scheme, to minimize differences between predicted or modeled waveforms of near-surface noise and waveforms extracted from the acquired seismic data.

9. The method of claim 7, further comprising repeating said method for one or more additional seismic data traces and time windows.

10. The method of claim 9, wherein full data redundancy is utilized by considering all contributing sources in the optimization of a predicted waveform corresponding to a given measured seismic data trace.

11. The method of claim 7, further comprising summing all of the predicted waveforms for each of the contributing sources and for each mode, and using that sum as the modeled noise which is subtracted or adaptively subtracted from the seismic data measured by the receiver.

12. The method of claim 7, wherein the down-scaling of the seismic amplitudes to account for wave-spreading changes with distance traveled from the source comprises scaling the amplitudes in proportion to the inverse square root of the distance traveled.

13. The method of claim 7, wherein the predicted waveforms are made to match actual waveforms in both amplitude and phase.

14. The method of claim 7, wherein the predicted waveform for the near-surface noise is a plane wave, and the surface-consistent properties are coefficients or terms in a mathematical expression for the plane wave.

15. The method of claim 14, wherein the coefficients or terms in the mathematical expression for the plane wave include at least one of a group consisting of:
   a receiver coupling term for the receiver, which is a complex quantity, a function of frequency, and includes both amplitude and phase effects associated with the receiver's location;
   a source encoding term for each window and contributing source; and
   a source coupling term for each source location, which is a complex quantity, a function of frequency, and includes both amplitude and phase effects associated with the source's location.

16. The method of claim 14, wherein the mathematical expression for the plane wave takes into account a plurality of different modes of near-surface wave propagation, and interference effects between the different modes.

17. The method of claim 7, wherein the surface-consistent properties over a raypath are determined bin-by-bin, for each bin crossed by the raypath, the surface having been subdivided into regular or irregular bins.

18. A non-transitory computer readable medium encoded with instructions which when executed by a computer causes the computer to implement a method for predicting and removing near-surface noise from seismic data acquired using a plurality of encoded sources operating simultaneously so as to produce time-overlapping records at each of a plurality of seismic receivers, said method comprising:
  using locations of the sources and their respective encoding information to characterize near-surface properties affecting propagation of seismic energy along the surface from each source to each seismic receiver;
  predicting time-overlapping noise recorded by a selected receiver; and
  converting the time-overlapping noise and the seismic data into a subsurface image with reduced noise by subtracting or adaptively subtracting the predicted noise from the seismic data measured by the selected receiver to yield data with reduced near-surface noise,
  wherein the characterizing of near-surface properties comprises using waveform tomography using an iterative model optimization method.

19. A method for predicting and removing near-surface noise from seismic data, comprising:
  acquiring the seismic data by exciting a plurality of encoded sources operating simultaneously so as to produce time-overlapping records that are recorded at a plurality of seismic receivers;
  using locations of the sources and their respective encoding information to characterize near-surface properties affecting propagation of seismic energy along the surface from each source to each receiver;
  using a computer to predict time-overlapping noise recorded by a selected receiver; and
  subtracting or adaptively subtracting, with a computer, the predicted noise from the seismic data measured by the selected receiver to yield data with reduced near-surface noise,
  wherein at least two different modes of near-surface noise are characterized, modeled, and subtracted, and
  wherein the at least two different modes comprise at least two of a group consisting of surface waves, refracted waves, and guided waves.

20. A method for predicting and removing near-surface noise from seismic data, comprising:
  acquiring the seismic data by exciting a plurality of encoded sources operating simultaneously so as to produce time-overlapping records that are recorded at a plurality of seismic receivers;
  using locations of the sources and their respective encoding information to characterize near-surface properties affecting propagation of seismic energy along the surface from each source to each receiver;
  using a computer to predict time-overlapping noise recorded by a selected receiver; and
  subtracting or adaptively subtracting, with a computer, the predicted noise from the seismic data measured by the selected receiver to yield data with reduced near-surface noise,
  wherein the characterizing near-surface properties and the predicting of the time-overlapping noise includes
    for each seismic data trace in the seismic data and a selected time window, identifying simultaneous contributing sources, their locations, and their encoding functions,
    determining raypaths along the surface connecting each receiver to each contributing source,
    determining the surface-consistent properties of one or more of modes of propagation of seismic energy along the raypaths, and
    for each of the contributing sources and for each mode, predicting a waveform for the near-surface noise by integrating effects of the surface-consistent properties over a raypath connecting the contributing source to the selected receiver and down-scaling seismic amplitudes to account for wave-spreading changes as distance from the source increases.

* * * * *